United States Patent [19]
Washizu

[11] Patent Number: 5,112,084
[45] Date of Patent: May 12, 1992

[54] CONNECTOR FOR SMALL-DIAMETER PIPING

[75] Inventor: Katsushi Washizu, Shizuoka, Japan

[73] Assignee: Usui Kokusai Sangyo Kaisha, Ltd., Japan

[21] Appl. No.: 475,434

[22] Filed: Feb. 5, 1990

[30] Foreign Application Priority Data

Feb. 7, 1989 [JP] Japan .................... 1-13407
Feb. 7, 1989 [JP] Japan .................... 1-28019

[51] Int. Cl.⁵ .............................. F16L 35/00
[52] U.S. Cl. ............................ 285/24; 285/319; 285/351; 285/921
[58] Field of Search ............ 285/319, 921, 351, 24

[56] References Cited

U.S. PATENT DOCUMENTS

| | | |
|---|---|---|
| 2,892,991 | 6/1959 | Beebee et al. |
| 3,169,030 | 2/1965 | Lippincott |
| 3,453,005 | 7/1969 | Foults |
| 3,826,523 | 7/1974 | Eschbaugh |
| 3,933,378 | 1/1976 | Sandford et al. |
| 4,026,581 | 5/1977 | Pasbrig |
| 4,035,005 | 7/1977 | De Vincent et al. |
| 4,074,912 | 2/1978 | Van Bilderbeek et al. |
| 4,135,745 | 1/1979 | Dehor ............ 285/921 X |
| 4,219,222 | 8/1980 | Brusadin |
| 4,275,907 | 6/1981 | Hunt |
| 4,451,069 | 5/1984 | Melone |
| 4,601,497 | 7/1986 | Bartholomew |
| 4,610,468 | 9/1986 | Wood ............ 285/921 X |
| 4,637,636 | 1/1987 | Guest |
| 4,637,640 | 1/1987 | Fournier et al. |
| 4,673,199 | 6/1987 | Renfrew |
| 4,681,351 | 7/1987 | Bartholomew |
| 4,730,856 | 3/1988 | Washizu |
| 4,749,214 | 6/1988 | Hoskins et al. |
| 4,753,458 | 6/1988 | Case et al. |
| 4,776,616 | 10/1988 | Umehara et al. |
| 4,778,203 | 10/1988 | Bartholomew |
| 4,781,400 | 11/1988 | Cunningham |
| 4,793,637 | 12/1988 | Laipply et al. |
| 4,895,396 | 1/1990 | Washizu ........... 265/351 X |
| 4,944,536 | 7/1990 | Bartholomew ......... 285/319 |

FOREIGN PATENT DOCUMENTS

| | | |
|---|---|---|
| 2730611 | 8/1978 | Fed. Rep. of Germany ...... 285/921 |
| 593413 | 5/1959 | Italy |
| 855603 | 12/1960 | United Kingdom |

Primary Examiner—Dave W. Arola
Attorney, Agent, or Firm—Anthony J. Casella; Gerald E. Hespos

[57] ABSTRACT

A connector used in connecting a resin tube and a metallic pipe of comparatively small diameter comprises a connector body and a socket member. The connector body has a through hole and an accepting chamber axially formed therein. A rear wall portion of the accepting chamber defines a lock wall. The socket member adapted to be seated in the accepting chamber has an axial cutoff formed in a peripheral wall thereof to assume a substantial C-shape in section. The peripheral wall of the socket member, whose one end is adapted to abut on an expanded portion of the pipe, has a pair of pawl portions integral therewith extending obliquely outward on the side of the other end. The distal end of each of the paired pawl portions is adapted to resiliently engage with the lock wall.

16 Claims, 4 Drawing Sheets

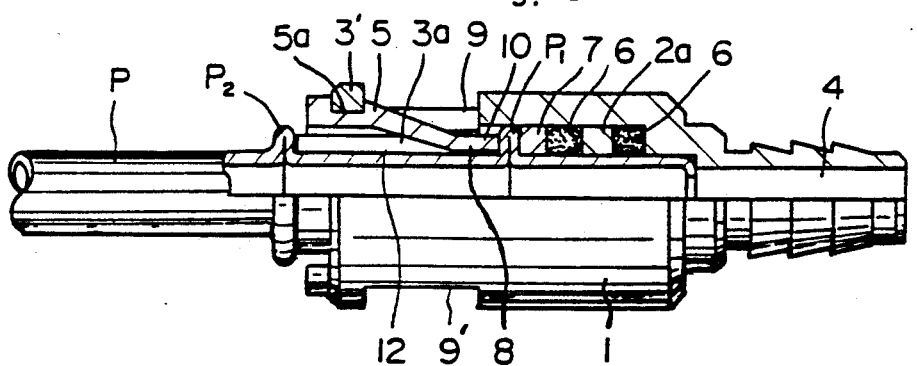
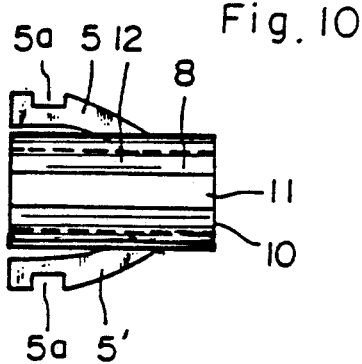
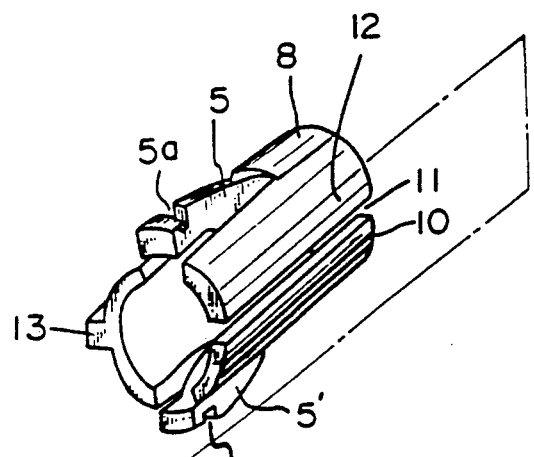
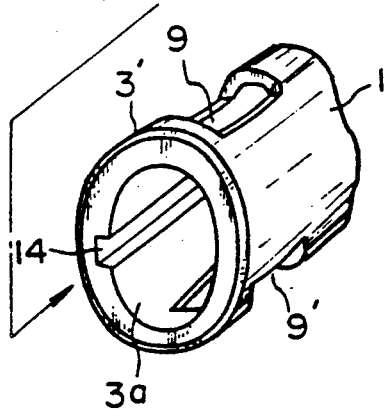
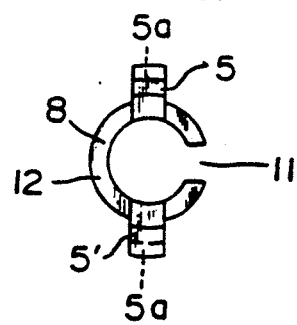

PRIOR ART

CONNECTOR FOR SMALL-DIAMETER PIPING

BACKGROUND OF THE INVENTION

1. Field of the Invention

This invention relates to a connector which is used in connecting a resin tube and a metallic pipe of comparatively small diameter (up to 20 mm) provided in various machines such as cars as a supply path of oil, air, etc.

2. Description of the Prior Art

A conventional connector is configured as shown in FIG. 13. Specifically, a connector body 21 has a through hole 24, a small-diameter chamber, and a stepped large-diameter chamber 22 axially formed therein in mutual communication, and is provided at the rear end thereof with an annular lock wall 21'. A socket member 23 comprises a cylindrical wall portion and two pawl portions 23' and 23'' projecting therefrom obliquely inward. In use, an annularly expanded portion $P_1'$ of a pipe P' is put in the large-diameter chamber 22, the distal ends of the pawl portions 23' and 23'' are brought into contact with the expanded portion $P_1'$, and the cylindrical wall portion of the socket member 23 is locked to the lock wall 21'.

Therefore, to fit the socket member 23 into the connector body 21, the cylindrical wall portion and root portions of the pawl portions must be decreased in outer diameter so as to pass through the bore of the annular lock wall, this operation of causing deformation in the cylindrical wall portion being troublesome. Further, because the pawl portions 23' and 23'' must exert their snap action at the time of connection of the pipe P', this increases the size of the socket member 23 or the overall size of the connector, tending to cause interference with other parts in use. Furthermore, because the pawl portions 23' and 23'' must be elongated with an increase in the overall size, this weakens the locking force of the pawl portions acting on the expanded portion $P_1'$ of the pipe P', making connection non-reliable in prolonged use due to fatigue.

SUMMARY OF THE INVENTION

It is an object of the present invention to provide a connector for small-diameter piping which can be assembled through a simple operation, can be made small in size and compact radially, avoiding interference in use, can provide reliable resilient connection for a pipe, and can maintain proper connection for a long time.

To accomplish the foregoing object, the present invention provides a connector for small-diameter piping which comprises a connector body having a through hole means and an accepting chamber axially formed in a front portion and a rear portion thereof, respectively, a rear wall portion of the accepting chamber defining a lock wall, and at least one sealing element being fitted to the inner surface of the through hole means; and a socket member adapted to be seated in the accepting chamber, which is made of elastic material and has an axial cutoff formed in a peripheral wall thereof to assume a substantial C-shape in section, the peripheral wall of the socket member, whose one end is adapted to abut on an expanded portion of a pipe to be connected, having a pair of pawl portions integral therewith extending obliquely outward on the side of the other end, and the distal end of each of the paired pawl portions having means for resilient engagement with the lock wall.

The through hole means comprises a through hole and an annular groove contiguous thereto, the sealing element being fitted in the groove. Or, the through hole means comprises a through hole and a small-diameter chamber contiguous thereto, the sealing element being fitted in the small-diameter chamber. A spacer may be interposed between the sealing elements fitted in the small-diameter chamber, and a bush may be provided in the rear of the sealing element.

The accepting chamber is a large-diameter chamber contiguous to the through hole means, a rear wall portion of the large-diameter chamber being bent inward to define the lock wall. Or, the accepting chamber is an extension chamber of the small-diameter chamber, a peripheral wall portion of the extension chamber being formed with elongate lock openings, whose rear portion defines the lock wall.

The resilient engagement means is the end face of the distal end of each of the paired pawl portions, or a groove formed in the outer face of the distal end of each of the paired pawl portions.

The socket member is made of metallic spring plate, resin, or rubber.

As will be appreciated from the foregoing, the socket member of substantial C-shape in section has the peripheral wall whose front end is adapted to engage with the annularly expanded portion of the pipe, and the pawl portions whose distal ends are adapted to be resiliently locked to the lock wall. Therefore, the pipe and the connector can be readily connected together by attaching the socket member to the pipe and pushing the thus attached combination into the connector body, the socket member itself can be made small in size, the overall size of the connector can be made compact, especially in the radial direction, the connector causes no interference with other parts even when used in a narrow space, the pawl portions can fully exert their resilient locking force on the expanded portion of the pipe, and the connected state can be reliably maintained for a long time.

BRIEF DESCRIPTION OF THE DRAWINGS

FIG. 9 is a vertical sectional view showing a fifth embodiment of the connector;

FIG. 10 is a plan view of the socket member shown in FIG. 8;

FIG. 11 is a side view of the above;

FIG. 12 is an exploded perspective view showing a sixth embodiment of the connector.

DETAILED DESCRIPTION OF THE PREFERRED EMBODIMENTS

Figure 1:
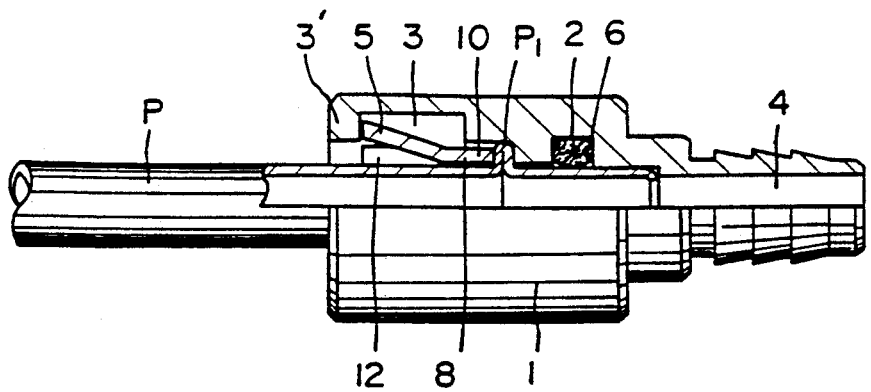
FIG. 1 is a vertical sectional view showing a first embodiment of a connector for small-diameter piping according to the present invention.

In the drawings, the same or similar components are designated by the same reference numeral.

Figure 2:
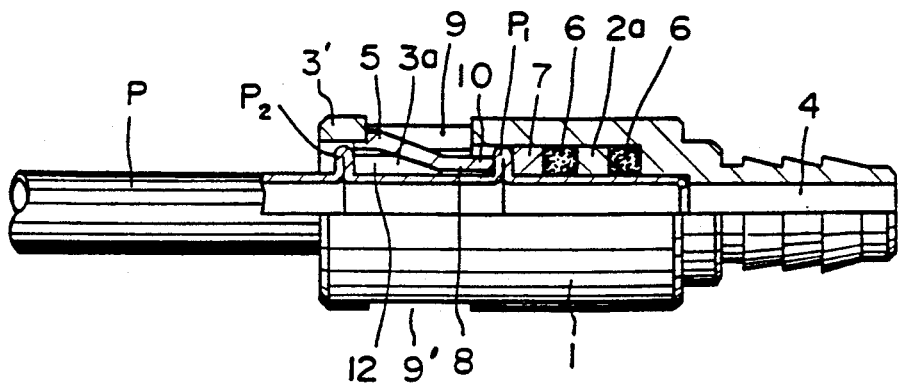
FIG. 2 is a vertical sectional view showing a second embodiment of the connector.
Figure 3:
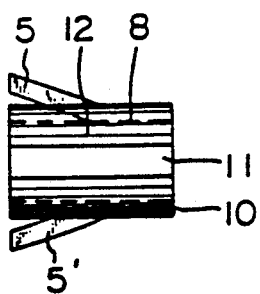
FIG. 3 is a plan view of the socket member shown in FIG. 1.
Figure 4:
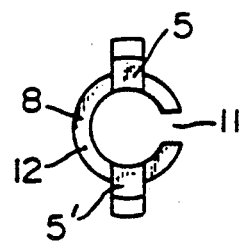
FIG. 4 is a side view of the above.
Figure 5:
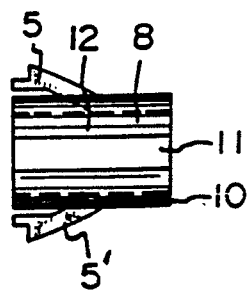
FIG. 5 is a plan view of the socket member shown in FIG. 2.
Figure 6:
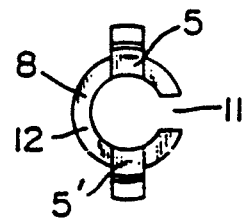
FIG. 6 is a side view of the above.

In FIGS. 1 through 7, a connector body 1 has a through hole 4 axially formed in a front portion thereof whose surrounding sleeve wall portion is adapted for connection with a resin tube or rubber hose (not shown). Following the through hole 4, there are formed an annular groove 2 ( FIG. 1 ) or a stepped small-diameter chamber 2a (FIG. 2), and a large-diameter chamber 3 or an extension chamber 3a. A rear wall portion of the large-diameter diameter chamber 3 is bent inward to define a lock wall 3' (FIG. 1), or a peripheral wall portion of the extension chamber 3a has elongate lock openings 9 and 9' formed therein and its rear portion defines a lock wall 3' (FIG. 2). A sealing element 6 made of elastic material such as rubber is fitted in the annular groove 2 or in the small-diameter chamber 2a. If necessary, a spacer such as vibration absorbing ring and an annular bush 7 may be fitted in (FIG. 2). A socket member 8 is made of metallic spring plate or elastic material (such as resin or rubber), which is seated in the large-diameter chamber 3 or in the extension chamber 3a. Specifically, a peripheral wall 10 of the socket member 8 is formed with an axial cutoff 11 to assume a substantial C-shape in section, and has a pair of pawl portions 5 and 5' formed integrally therewith which extend obliquely outward.

To seat the socket member 8 in the large-diameter chamber 3 or in the extension chamber 3a, the socket member 8 is attached to the rear of an annularly expanded portion $P_1$ of a pipe P so that the front end of the peripheral wall 10 abuts on the expanded portion $P_1$ from rear and the pawl portions 5 and 5' are resiliently locked to the lock wall 3' of the connector body 1 from inside.

In FIG. 2, the pipe P has another expanded portion $P_2$ spaced apart from the first expanded portion $P_2$. In this case, the substantially C-shaped wall portion 12 of the socket member 8 is attached between the two expanded portions $P_1$ and $P_2$ of the pipe P.

Figure 7:
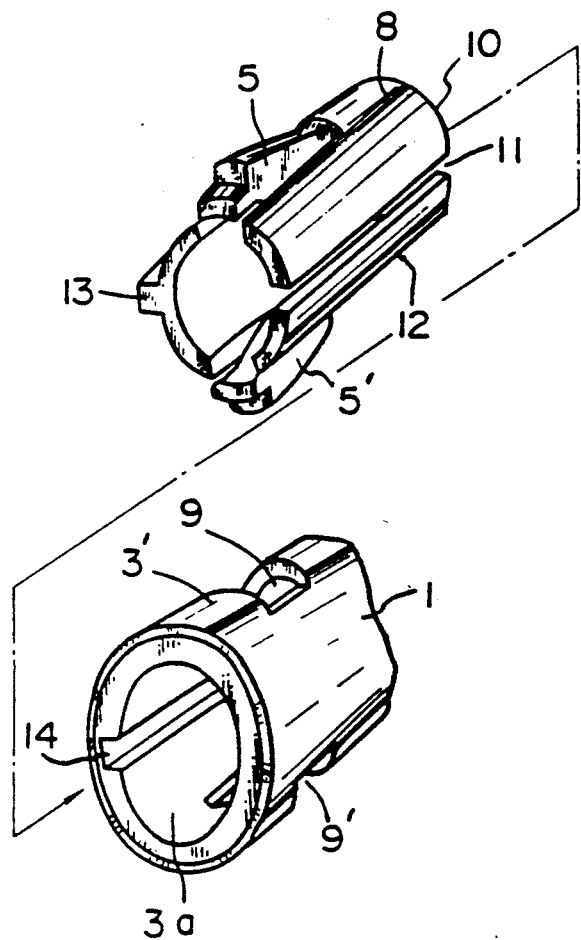
FIG. 7 is an exploded perspective view showing a third embodiment of the connector.
Figure 8:
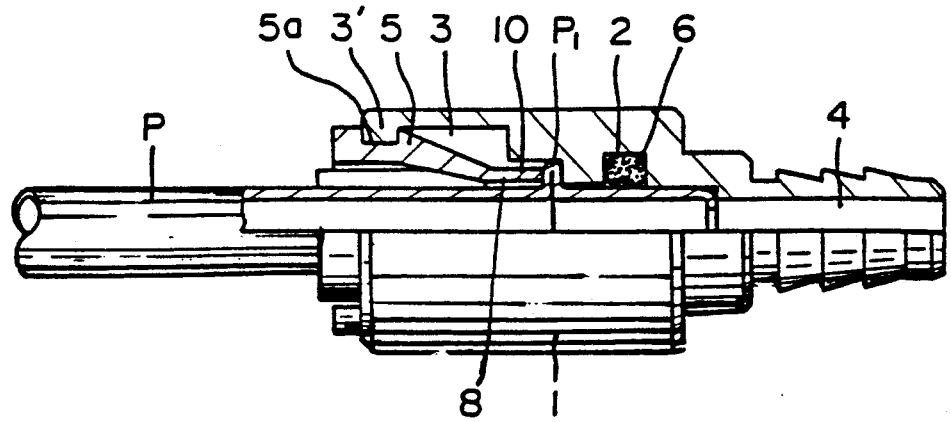
FIG. 8 is a vertical sectional view showing a fourth embodiment of the connector.
Figure 13:
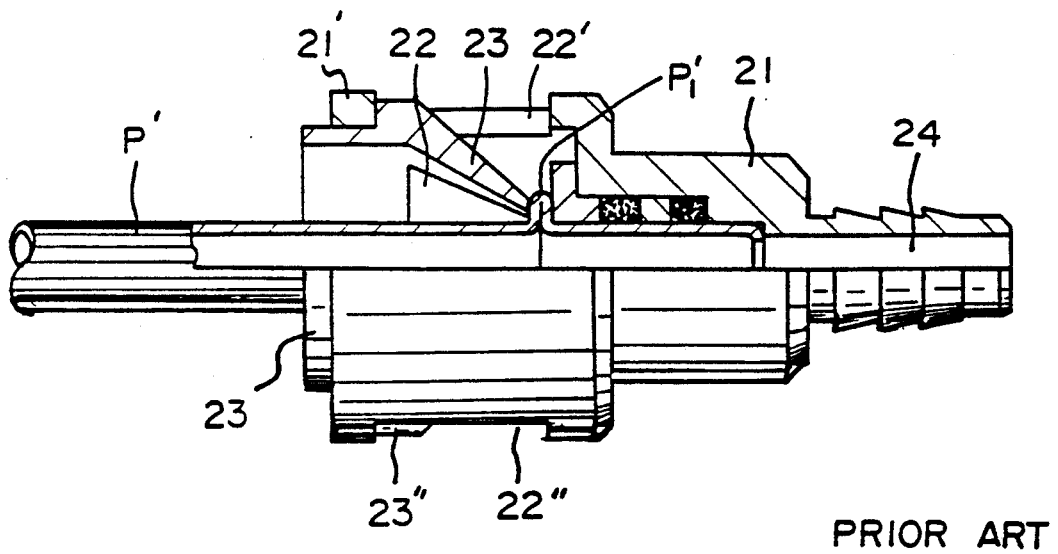
FIG. 13 is a vertical sectional view showing a conventional connector for piping.

In FIG. 7, the socket member 8 has an axial protrusion 13 formed on the wall portion 12, and an axial groove 14 is formed in the inner surface of the large-diameter chamber 3 or of the extension chamber 3a, the foregoing two 13 and 14 defining a positioning/keying means. This positioning/keying means facilitates the alignment of the pawl portions 5 and 5' of the socket member 8 with the lock openings 9 and 9' of the connector body 1.

The embodiments of FIGS. 8 through 12 are substantially identical with those of FIGS. 1 through 7 in the structure of the connector body 1, but not in the structure of the socket member 8.

In FIGS. 8 through 12, each of the paired pawl portions 5 and 5' extending obliquely outward from the peripheral wall 10 of the socket member 8 has a groove 5a formed in the outer face thereof. When the socket member 8 is seated in the connector body 1, the grooves 5a and 5a are resiliently engaged with the lock wall 3' of the connector body 1.

By pinching and pressing the distal ends of the paired pawl portions 5 and 5' mutually inward in case of need, the socket member 8 can be readily removed from the connector body 1.

In FIG. 9, the pipe P has another expanded portion $P_2$ spaced apart from the first expanded portion $P_1$ (as is the case of FIG. 2). Specifically, the second expanded portion $P_2$ is formed at a position in the rear of the paired pawl portions 5 and 5'.

To incorporate the positioning/keying means as shown in FIG. 7 in the combination of connector body 1 and socket member 8, in FIG. 12, the axial groove 14 is formed in the inner surface of the large-diameter chamber 3 or of the extension chamber 3a, and the axial protrusion 13 is formed on the outer surface of the socket member 8, the two being engageable together.

As described above, in the connector for small-diameter piping according to the present invention, the socket member 8 is formed with the axial cutoff 11 to assume a substantial C-shape in section, whose peripheral wall 10 adapted to abut on the expanded portion $P_1$ of the pipe P has the pawl portions 5 and 5' adapted to be resiliently locked to the lock wall 3' of the connector body 1. Therefore, the pipe P and the connector can be readily connected together by attaching the socket member 8 to the rear of the expanded portion $P_1$ or between the two expanded portions of the pipe, and pushing the thus attached combination into the connector body 1. Further, the socket member 8 itself can be made small in size, the overall size of the connector can be made compact, especially in the radial direction, the connector causes no interference with other parts even when used in a narrow space, the pawl portions 5 and 5' can fully exert their resilient locking force on the expanded portion $P_1$ of the pipe P, and the socket member 8 can be readily removed in case of need.

What is claimed is:

1. A connector for a small-diameter pipe having an expanded portion in proximity to one end thereof, said connector comprising:

a connector body having opposed front and rear ends, a through hole extending axially therethrough from the front end to the rear end, a small-diameter chamber defined in the connector body contiguous to the through hole therein, portions of the through hole adjacent said rear end defining an accepting chamber, said accepting chamber being an extension of the small diameter chamber, a peripheral wall portion of the accepting chamber being formed with elongate lock openings, a rear wall portion of the accepting chamber adjacent the lock openings defining a lock wall, and at least one sealing element being fitted to the inner surface of the small-diameter chamber, and a socket member comprising a peripheral wall defining opposed front and rear axial ends and a through hole extending therebetween, the through hole being dimensioned to fit over the small-diameter pipe such that the front end of the peripheral wall engages the expanded portion of the pipe, the socket member being dimensioned to be seated in the accepting chamber of the connector body, said socket member being made of elastic material and having an axial cutoff formed in the peripheral wall thereof and extending from the front end to the rear end to assume a substantial C-shape in section, the peripheral wall of the socket member having a pair of resilient pawl portions integral therewith and cantilevered from a location intermediate the front and rear ends to extend obliquely outward toward the rear end, portions of the rear end of the peripheral wall in alignment with the pawl portions being discontinuous to facilitate inward deflection of the pawl portions, and the distal end of each of the paired pawl portions having means adjacent the rear end of the peripheral wall for resilient engagement with the lock wall of the connector body.

2. A connector according to claim 1, wherein the reilient engagement means is the end face of the distal end of each of the paired pawl portions.

3. A connector according to claim 1, wherein the resilient engagement means is a groove formed in the outer face of the distal end of each of the paired pawl portions.

4. A connector according to claim 1, wherein the socket member is made of metallic spring plate.

5. A connector according to claim 1, wherein the pipe has another annularly expanded portion spaced apart from the first annularly expanded portion.

6. A connector according to claim 5, wherein the substantially C-shaped peripheral wall of the socket member is dimensioned to be attached between the two annularly expanded portions of the pipe.

7. A connector according to claim 6, wherein the end face of the distal end of each of the paired pawl portions is dimensioned to be positioned in front of the second annularly expanded portion of the pipe.

8. A connector according to claim 1 wherein the socket member is made of resin.

9. A connector according to claim 1 wherein the socket member is made of rubber.

10. A connector for a small-diameter pipe having an expanded portion in proximity to one end thereof, said connector comprising:
   a connector body having opposed front and rear ends, a through hole extending axially therethrough from the front end to the rear end, portions of the through hole adjacent said rear end defining an enlarged diameter accepting chamber, a rear wall portion of the accepting chamber defining a lock wall, and at least one sealing element being fitted to the inner surface of the through hole,
   a socket member comprising a peripheral wall defining opposed front and rear axial ends and a through hole extending therebetween, the through hole being dimensioned to fit over the small-diameter pipe such that the front end of the peripheral wall engages the expanded portion of the pipe, the socket member being dimensioned to be seated in the accepting chamber, of the connector body, said socket member being made of elastic material and having an axial cutoff formed in the peripheral wall thereof and extending from the front end to the rear end to assume a substantial C-shape in section, the peripheral wall of the socket member having a pair of resilient pawl portions integral therewith and cantilevered from a location intermediate the front and rear ends to extend obliquely outward toward the rear end, portions of the rear end of the peripheral wall in alignment with the pawl portions being discontinuous to facilitate inward deflection of the pawl portions, and the distal end of each of the paired pawl portions having means adjacent the rear end of the peripheral wall for resilient engagement with the lock wall of the connector body, and
   positioning/keying means being provided between the outer surface of the substantially C-shaped peripheral wall of the socket member and the inner surface of the accepting chamber of the connector body for ensuring a selected rotational alignment between the socket member and the connector body.

11. A connector according to claim 10, wherein the through hole comprises an annular groove contiguous thereto, the sealing element being fitted in the groove.

12. A connector according to claim 10, wherein the through hole comprises a small-diameter chamber contiguous thereto, the sealing element being fitted in the small-diameter chamber.

13. A connector according to claim 12, wherein said at least one sealing element comprises a plurality of sealing elements, and wherein a spacer is interposed between the sealing elements.

14. A connector according to claim 12, wherein a bush is provided in the rear of the sealing element.

15. A connector according to claim 12, wherein the accepting chamber is an extension chamber of the small-diameter chamber, a peripheral wall portion of the extension chamber being formed with elongate lock openings, whose rear portion defines the lock wall.

16. A connector according to claim 10, wherein the accepting chamber is a large-diameter chamber contiguous to the through hole, a rear wall portion of the large-diameter chamber being bent inward to define the lock wall.

* * * * *